United States Patent
Matsumura

(10) Patent No.: US 10,735,677 B2
(45) Date of Patent: Aug. 4, 2020

(54) IMAGE CAPTURING APPARATUS, METHOD, AND STORAGE MEDIUM FOR IMAGE FLICKER DETECTION AND CONTROL

(71) Applicant: CANON KABUSHIKI KAISHA, Tokyo (JP)

(72) Inventor: Koichi Matsumura, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/040,680

(22) Filed: Jul. 20, 2018

(65) Prior Publication Data
US 2019/0037157 A1    Jan. 31, 2019

(30) Foreign Application Priority Data

Jul. 26, 2017 (JP) ................................ 2017-144695

(51) Int. Cl.
| | |
|---|---|
| H04N 9/73 | (2006.01) |
| H04N 5/353 | (2011.01) |
| H04N 5/235 | (2006.01) |
| H04N 5/351 | (2011.01) |
| H04N 5/343 | (2011.01) |

(52) U.S. Cl.
CPC ......... *H04N 5/3532* (2013.01); *H04N 5/2353* (2013.01); *H04N 5/2357* (2013.01); *H04N 5/343* (2013.01); *H04N 5/351* (2013.01)

(58) Field of Classification Search
CPC ........................... H04N 5/3532; H04N 5/2353
USPC ....................................................... 348/226.1
See application file for complete search history.

(56) References Cited

U.S. PATENT DOCUMENTS

| | | | | |
|---|---|---|---|---|
| 2005/0275737 | A1* | 12/2005 | Cheng ............... | H04N 5/23293 348/333.02 |
| 2015/0163392 | A1* | 6/2015 | Malone ............... | H04N 5/2357 348/228.1 |
| 2015/0249775 | A1* | 9/2015 | Jacumet ............... | H04N 5/2251 348/333.11 |

FOREIGN PATENT DOCUMENTS

| | | |
|---|---|---|
| CN | 101335842 A | 12/2008 |
| CN | 102695004 A | 9/2012 |
| CN | 105282431 A | 1/2016 |

(Continued)

OTHER PUBLICATIONS

The above foreign patent documents were cited in a Apr. 28, 2020 Chinese Office Action, a copy of which is enclosed with an English Translation, that issued in Chinese Patent Application No. 201810817836.9.

*Primary Examiner* — Usman A Khan
(74) *Attorney, Agent, or Firm* — Cowan, Liebowitz & Latman, P.C.

(57) ABSTRACT

An image capturing apparatus includes an image sensor, and a control unit configured to control a timing of a start of electric charge accumulation of the pixels and a timing of readout, the control unit, with regard to a first area of the pixel region, causing electric charge accumulation in a first accumulation period, and causing a first readout in a first readout time, and, with regard to a second area, causing electric charge accumulation in a second accumulation period that is shorter than the first accumulation period, and causing a second readout in a second readout time that is longer than the first readout time, and causing the first readout and the second readout to be performed such that the first readout time and the second readout time do not temporally overlap with each other.

14 Claims, 15 Drawing Sheets

(56) References Cited

FOREIGN PATENT DOCUMENTS

| JP | 2015-088917 A | 5/2015 |
| JP | 2017-112501 A | 6/2017 |

\* cited by examiner

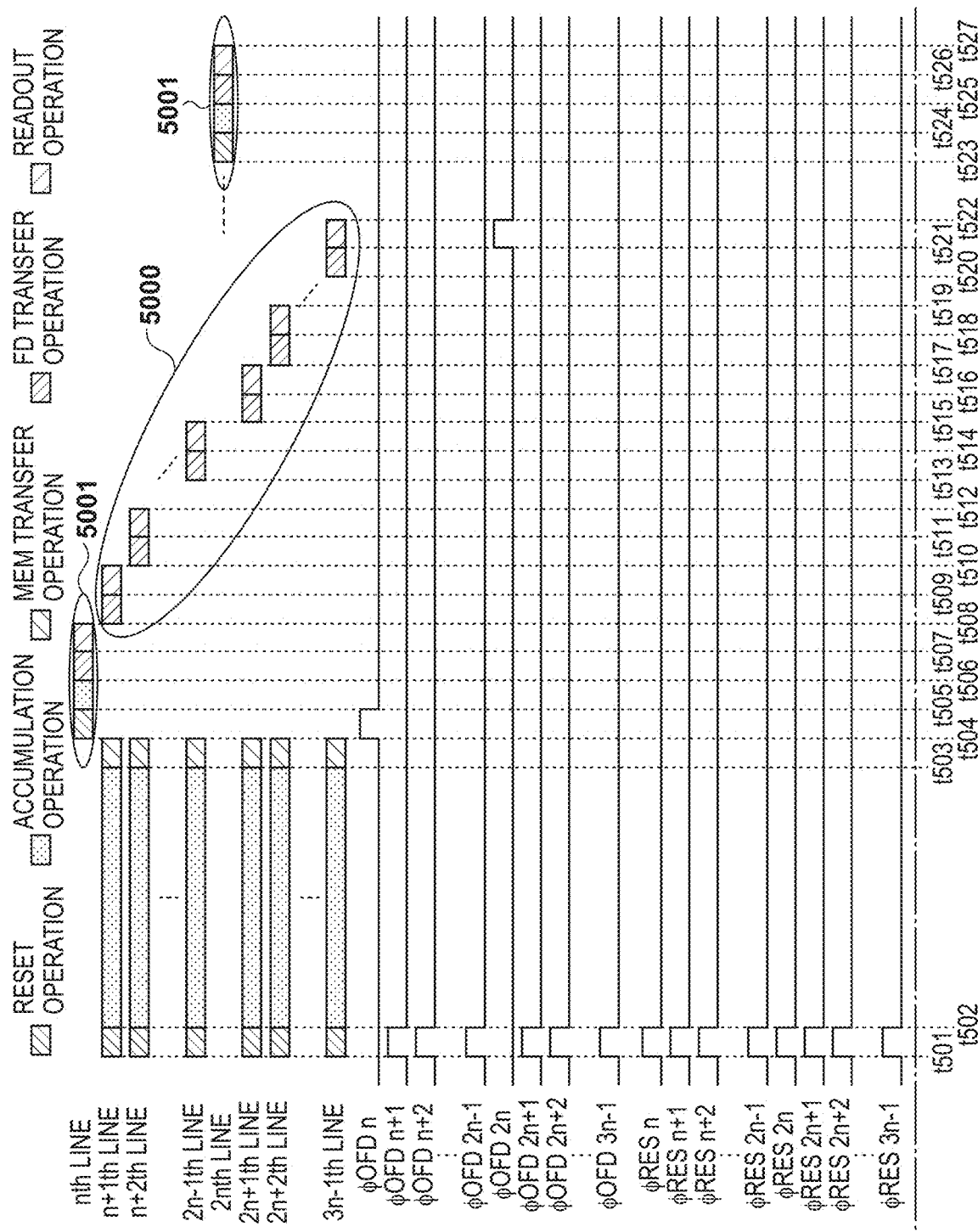

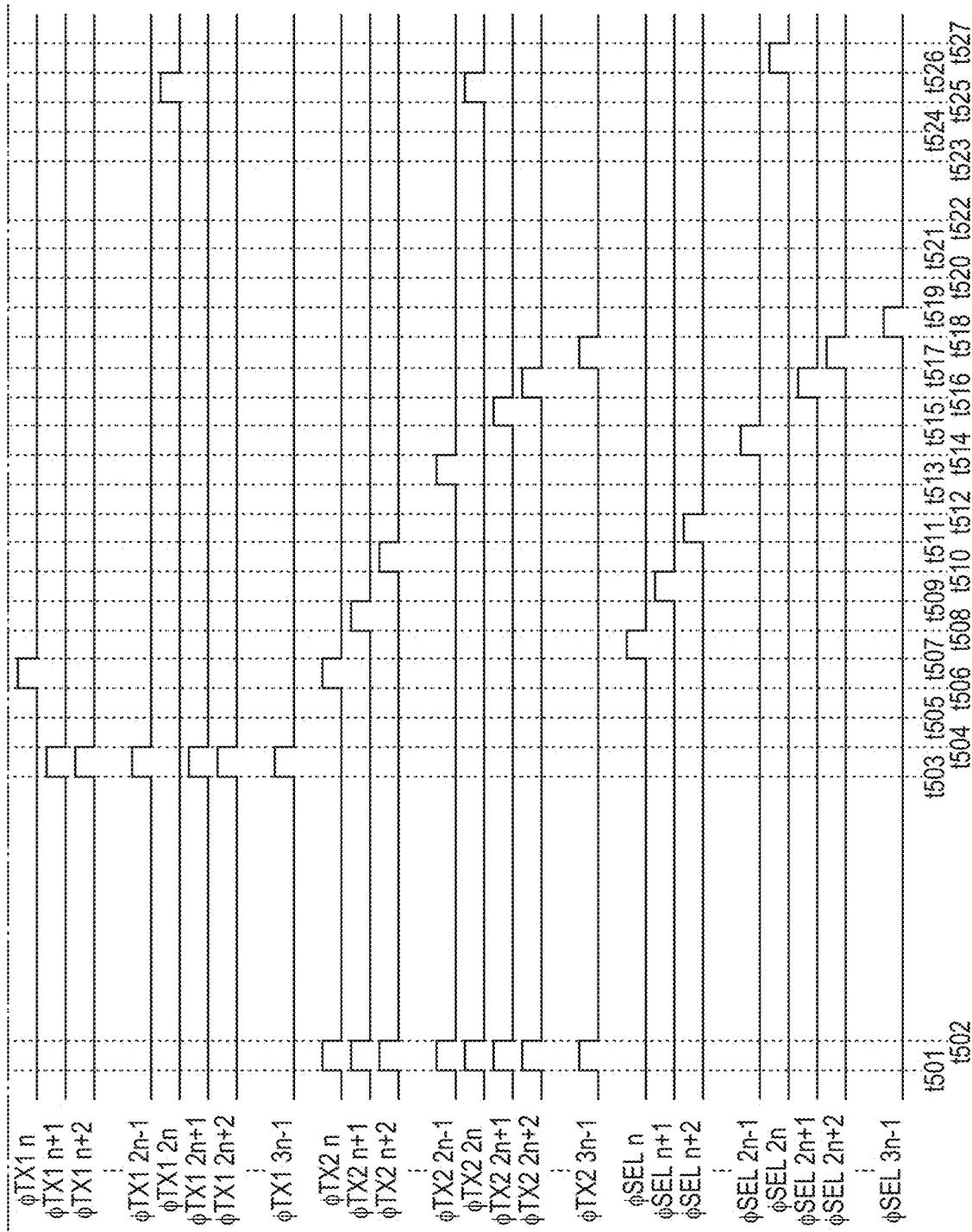

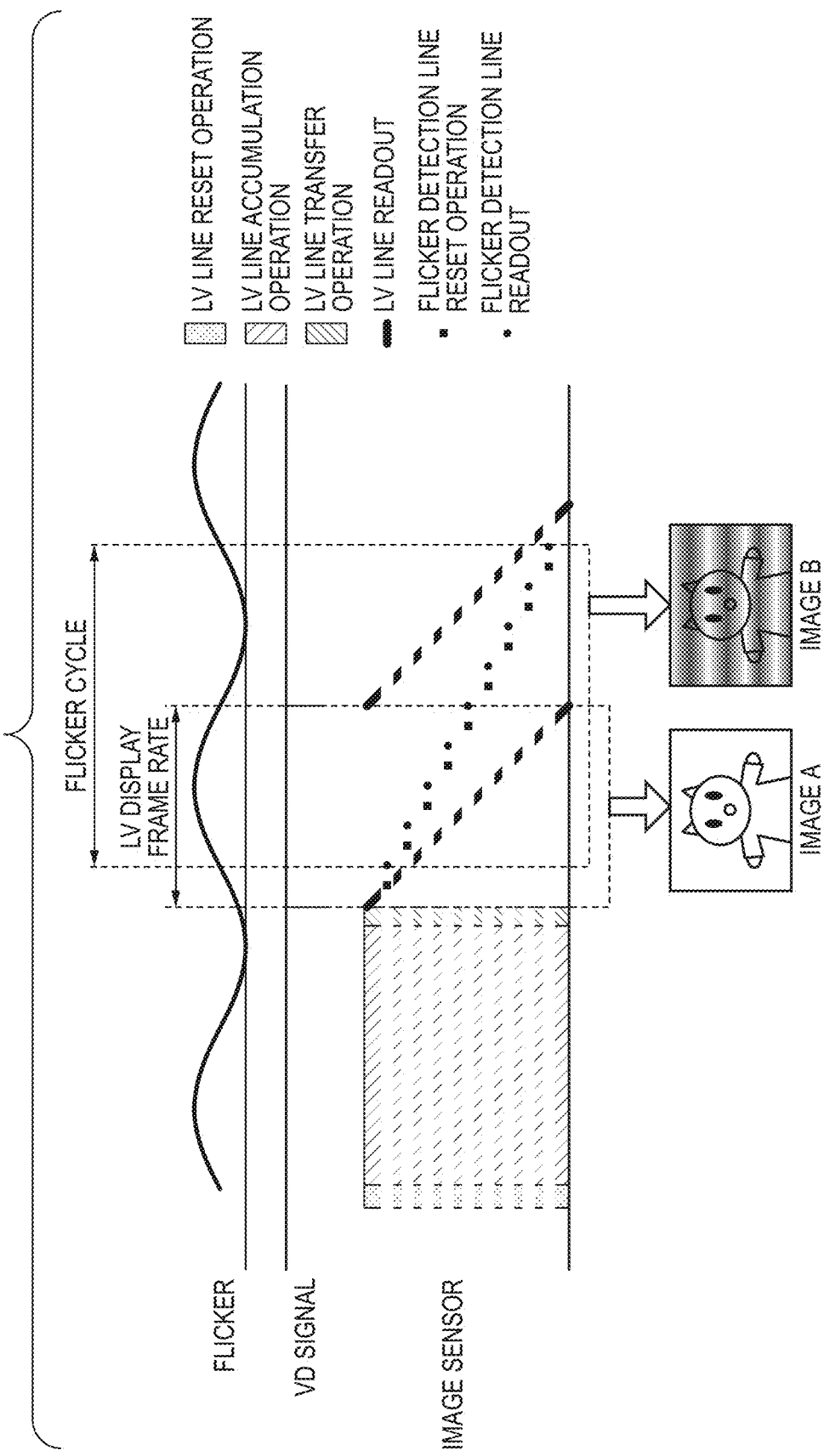

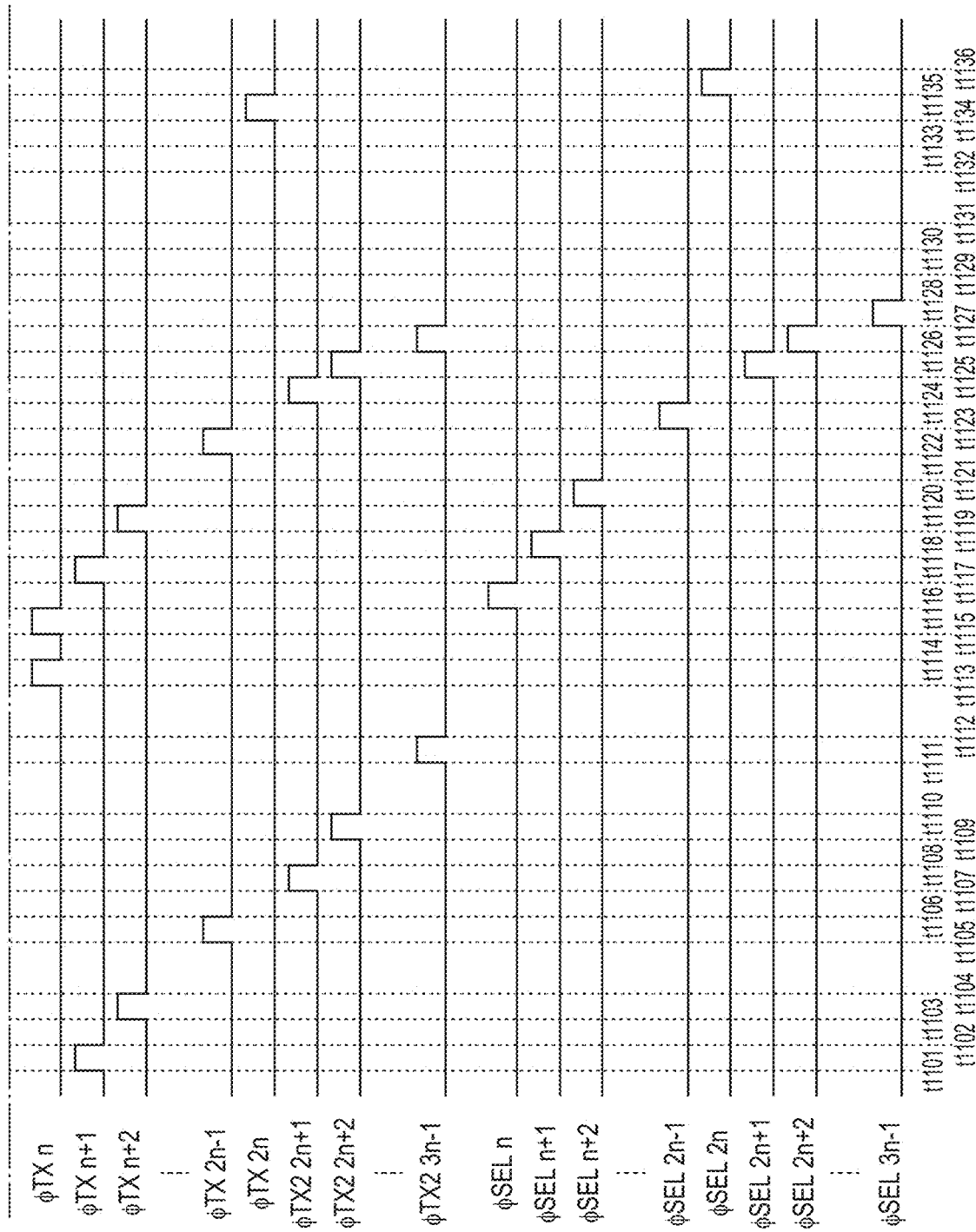

LINES USED FOR IMAGE A
LINES USED FOR IMAGE B

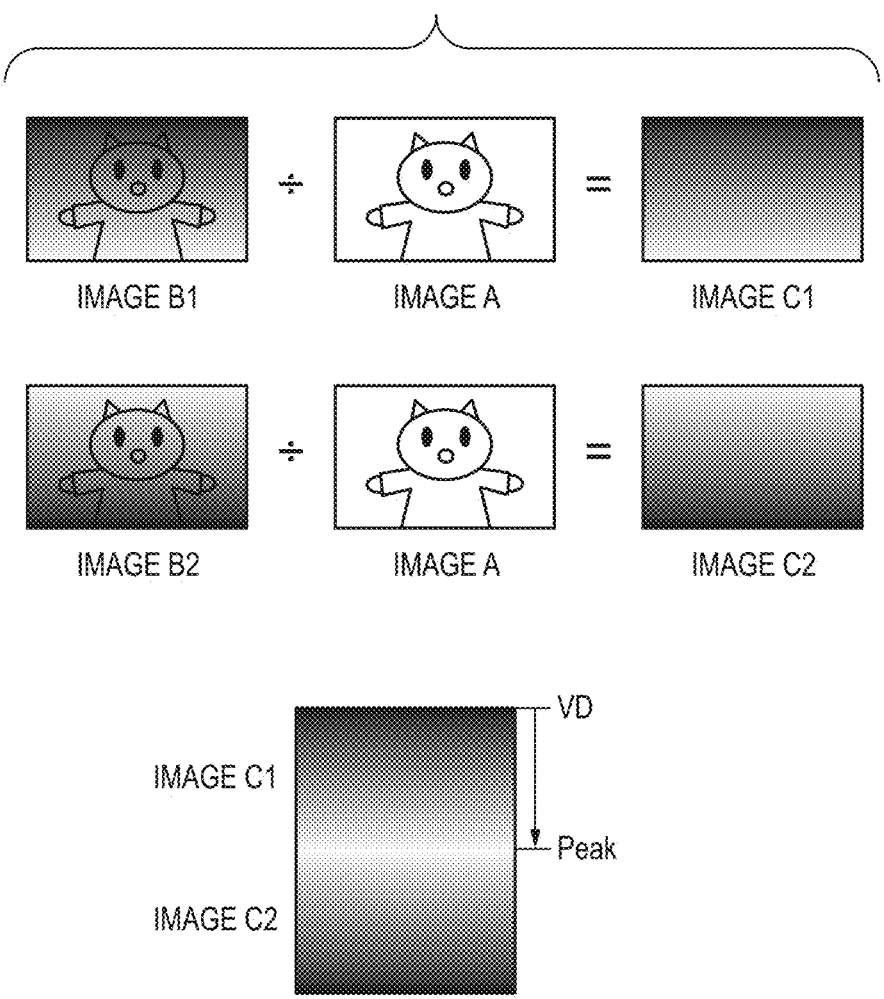

IMAGE CAPTURING APPARATUS, METHOD, AND STORAGE MEDIUM FOR IMAGE FLICKER DETECTION AND CONTROL

BACKGROUND OF THE INVENTION

Field of the Invention

The present invention relates to a technology for flicker detection in image capturing apparatuses such as digital cameras.

Description of the Related Art

Conventionally, in artificial light sources such as fluorescent lights, so-called flicker, which is a change in the amount of light in a predetermined cycle according to the frequency of a commercial power source, is known to occur. Japanese Patent Laid-Open No. 2015-088917 discloses a technology for driving an image sensor with a so-called slit rolling shutter system in which the timing for starting and ending accumulation of electric charge differs per line, and detecting the presence and frequency of flicker, based on exposure unevenness that occurs in images. Japanese Patent Laid-Open No. 2017-112501 discloses the following technology. Specifically, images in which exposure unevenness occurs after driving the image sensor with the slit rolling shutter system are acquired. Also, images in which exposure unevenness does not occur after driving the image sensor with a global shutter system are acquired. The presence and frequency of flicker are then detected, using the images in which exposure unevenness occurs and the images in which exposure unevenness does not occur.

However, with the conventional technologies disclosed in the abovementioned patent documents, LV images and exposure unevenness images need to be acquired alternately, in the case of detecting flicker during live view display (during LV display). Thus, there is a problem in that the frame rate of LV display will be restricted by the signal readout time of the image sensor, and drops to half the maximum frame rate.

Also, in recent years, the frame rate of LV display has tended to increase, and is expected to increase further into the future. When performing flicker detection during LV display in such a situation, the conventional technologies require that flicker detection frames having an exposure time longer than the flicker cycle be inserted between the live view frames. Thus, the frame rate of LV display drops.

SUMMARY OF THE INVENTION

The present invention has been made in consideration of the aforementioned problems, and provides an image capturing apparatus that is able to detect flicker with high accuracy, while maintaining the frame rate of live view display of moving images.

According to a first aspect of the present invention, there is provided an image capturing apparatus comprising: an image sensor having a pixel region in which pixels are two-dimensionally arrayed in a row direction and a column direction; and at least one processor or circuit configured to perform the operations of the following unit: a control unit configured to control, on a row-by-row basis, a timing of a start of electric charge accumulation of the pixels and a timing of readout of signals of the pixels, wherein the control unit, with regard to a first area of the pixel region, causes electric charge accumulation to be performed in a first accumulation period, and causes a first readout of signals of the pixels to be performed in a first readout time, and, with regard to a second area that is different from the first area, causes electric charge accumulation to be performed in a second accumulation period that is shorter than the first accumulation period, and causes a second readout of signals of the pixels to be performed in a second readout time that is longer than the first readout time, and causes the first readout and the second readout to be performed such that the first readout time and the second readout time do not temporally overlap with each other.

According to a second aspect of the present invention, there is provided a method for controlling an image capturing apparatus that includes an image sensor having a pixel region in which pixels are two-dimensionally arrayed in a row direction and a column direction, the method comprising: controlling, on a row-by-row basis, a timing of a start of electric charge accumulation of the pixels and a timing of readout of signals of the pixels, wherein the control includes, with regard to a first area of the pixel region, causing electric charge accumulation to be performed in a first accumulation period, and causing a first readout of signals of the pixels to be performed in a first readout time, and, with regard to a second area that is different from the first area, causing electric charge accumulation to be performed in a second accumulation period that is shorter than the first accumulation period, and causing a second readout of signals of the pixels to be performed in a second readout time that is longer than the first readout time, and causing the first readout and the second readout to be performed such that the first readout time and the second readout time do not temporally overlap with each other.

According to a third aspect of the present invention, there is provided a computer-readable storage medium storing a program for causing a computer to perform a control method for an image capturing apparatus that includes an image sensor having a pixel region in which pixels are two-dimensionally arrayed in a row direction and a column direction, the method comprising: controlling, on a row-by-row basis, a timing of a start of electric charge accumulation of the pixels and a timing of readout of signals of the pixels, wherein the control includes, with regard to a first area of the pixel region, causing electric charge accumulation to be performed in a first accumulation period, and causing a first readout of signals of the pixels to be performed in a first readout time, and, with regard to a second area that is different from the first area, causing electric charge accumulation to be performed in a second accumulation period that is shorter than the first accumulation period, and causing a second readout of signals of the pixels to be performed in a second readout time that is longer than the first readout time, and causing the first readout and the second readout to be performed such that the first readout time and the second readout time do not temporally overlap with each other.

Further features of the present invention will become apparent from the following description of exemplary embodiments with reference to the attached drawings.

BRIEF DESCRIPTION OF THE DRAWINGS

FIGS. 5A and 5B are timing charts of a drive method of the image sensor in the first embodiment.

FIG. 6 is a diagram showing the change in the light amount of flicker and the accumulation timing of captured images.

FIGS. 11A and 11B are timing charts of a drive method of an image sensor in the second embodiment.

FIG. 15 is a diagram showing a computation for extracting a stripe component caused by flicker in the fourth embodiment.

DESCRIPTION OF THE EMBODIMENTS

Hereinafter, embodiments of the present invention will be described in detail with reference to the accompanying drawings.

First Embodiment

Figure 1:
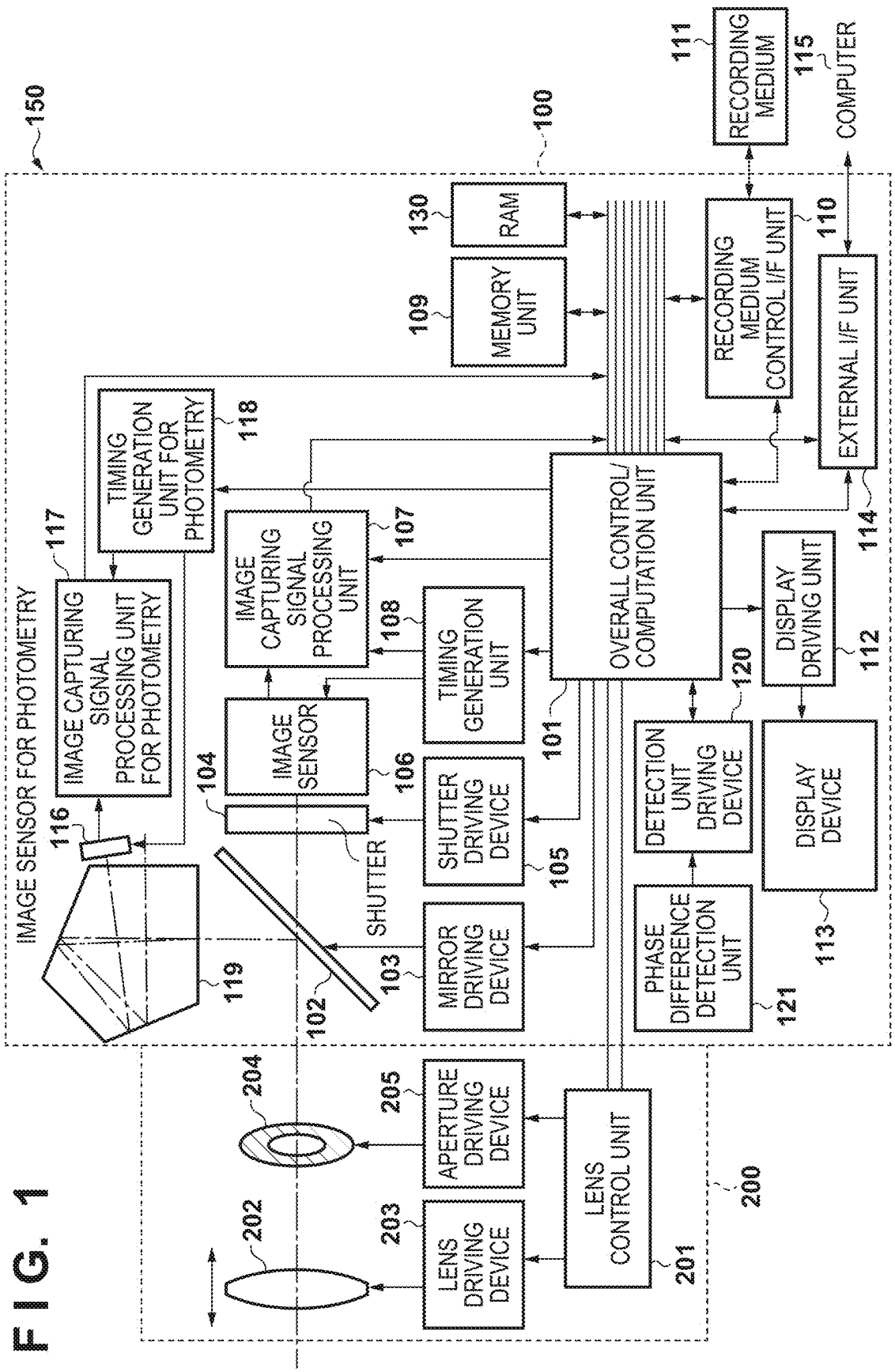
FIG. 1 is a block diagram showing a schematic configuration of a digital single lens reflex camera that is a first embodiment of an image capturing apparatus of the present invention.

FIG. 1 is a block diagram showing a schematic configuration of a digital single lens reflex camera that is a first embodiment of an image capturing apparatus of the present invention. Also, FIG. 2 is a diagram showing the arrangement of constituent elements within the camera body of the digital single lens reflex camera shown in FIG. 1.

Figure 2:
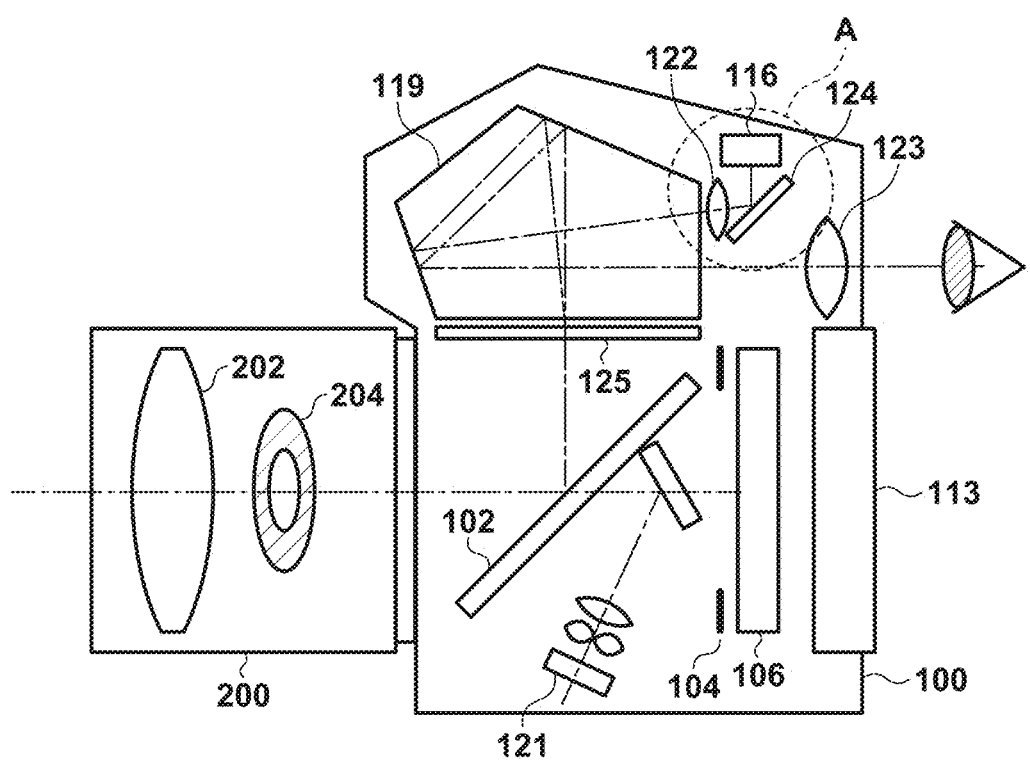
FIG. 2 is a diagram showing the arrangement of constituent elements within the camera body.

In FIGS. 1 and 2, a digital single lens reflex camera 150 is constituted with an interchangeable lens 200 detachably mounted to a camera body 100. The interchangeable lens 200 has a capturing lens 202, and the capturing lens 202 forms an optical image of an object on an image sensor 106. A lens driving device 203 drives the capturing lens 202 so as to come into (be brought into) focus. An aperture 204 controls the amount of reflected light from the object. An aperture driving device 205 drives the aperture 204. The interchangeable lens 200 is removable from the camera body 100, and communication is performed between the interchangeable lens 200 and the camera body 100 for the purpose of information exchange. Communication at this time is performed between an overall control/computation unit 101 of the camera body 100 and a lens control unit 201 of the interchangeable lens 200.

The overall control/computation unit 101 is arranged within the camera body 100, and performs various types of computational processing and integrally controls the camera body 100 and the interchangeable lens 200. A quick return (QR) mirror 102, during use of a viewfinder, guides an optical image that has passed through the capturing lens 202 to the viewfinder and an image sensor 116 for photometry for use in AE. Also, the QR mirror 102 pops up at the time of image capture, and the optical image is guided to the image sensor 106. A mirror driving device 103 drives the quick return mirror 102.

A shutter 104 is a shutter having a shutter curtain that is equivalent to a focal plane front curtain/rear curtain used in a so-called single-lens reflex camera. The shutter 104 controls the exposure time of the optical image that has passed through the capturing lens 202 and performs shading. A shutter driving device 105 drives the shutter 104. The image sensor 106 captures the optical image of the object formed by the capturing lens 202 as an image signal. The image sensor 106 of the present embodiment is a two-dimensional X-Y address scan type image sensor such as a CMOS sensor, for example, having a pixel region in which pixels are arrayed two-dimensionally in a row direction and a column direction. A rolling shutter system that involves controlling the electric charge accumulation period on a line-by-line basis through address designation and performing sequential readout on a line-by-line basis is employed.

An image capturing signal processing unit 107 performs amplification processing of the image signal that is output from the image sensor 106, and A/D conversion processing for performing analog-to-digital conversion. The image capturing signal processing unit 107 also performs various types of correction processing such as defect correction on image data after A/D conversion, compression processing for compressing image data, and the like. A timing generation unit 108 outputs various types of timing signals to the image sensor 106 and the image capturing signal processing unit 107.

A memory unit 109 temporarily stores image data processed by the image capturing signal processing unit 107, and the like, and permanently stores various types of adjustment values, programs for causing various types of controls by the overall control/computation unit 101 to be executed, and the like. A RAM 130 is used for extraction of programs that are stored in the memory unit 109, and is also used as a work area of the overall control/computation unit 101. A recording medium control interface (I/F) unit 110 is an interface for performing record processing of image data and the like to a recording medium 111 and readout processing of image data and the like from the recording medium 111. The recording medium 111 is a removable recording medium consisting of a semiconductor memory or the like that records various types of data such as image data. A display driving unit 112 drives a display device 113 that displays captured still images, moving images, and the like. An external interface (I/F) unit 114 exchanges information such as image signals and control signals with various external devices such as a computer 115.

The image sensor 116 for photometry is an image sensor for acquiring AE (auto-exposure) signals/light source detection signals, and is an RGB imager type image sensor. In the present embodiment, a CCD sensor or a CMOS sensor is used. A light beam whose light path is bent by the quick return mirror 102, and then dispersed by a light dispersion unit 125 and collected by a lens 122 via a pentaprism 119, before again being bent by a mirror 124, is input to the image sensor 116 for photometry.

An image capturing signal processing unit 1117 for photometry performs amplification processing of the image signal that is output from the image sensor 116 for photometry, and A/D conversion processing for performing analog-to-digital conversion. Also, the image capturing signal processing unit 1117 for photometry performs various types of correction processing such as defect correction on the image data after A/D conversion, compression processing for compressing image data, and the like. A timing generation unit 118 for photometry outputs various types of timing signals to the image sensor 116 for photometry and the image capturing signal processing unit 1117 for photometry.

The pentaprism 119 guides the light beam whose light path was bent by the quick return mirror 102 to a viewfinder 123 and the image sensor 116 for photometry. A phase difference detection unit 121 is a part that performs focus detection using a phase difference method, and, although not illustrated, acquires a pair of images whose phase changes depending on the defocusing amount from the light beam that has passed through the quick return mirror 102. The defocusing amount of the object is calculated from the shift amount of the two images in this pair, and the capturing lens 202 is moved. A detection unit driving device 120 drives the phase difference detection unit 121.

Figure 3:
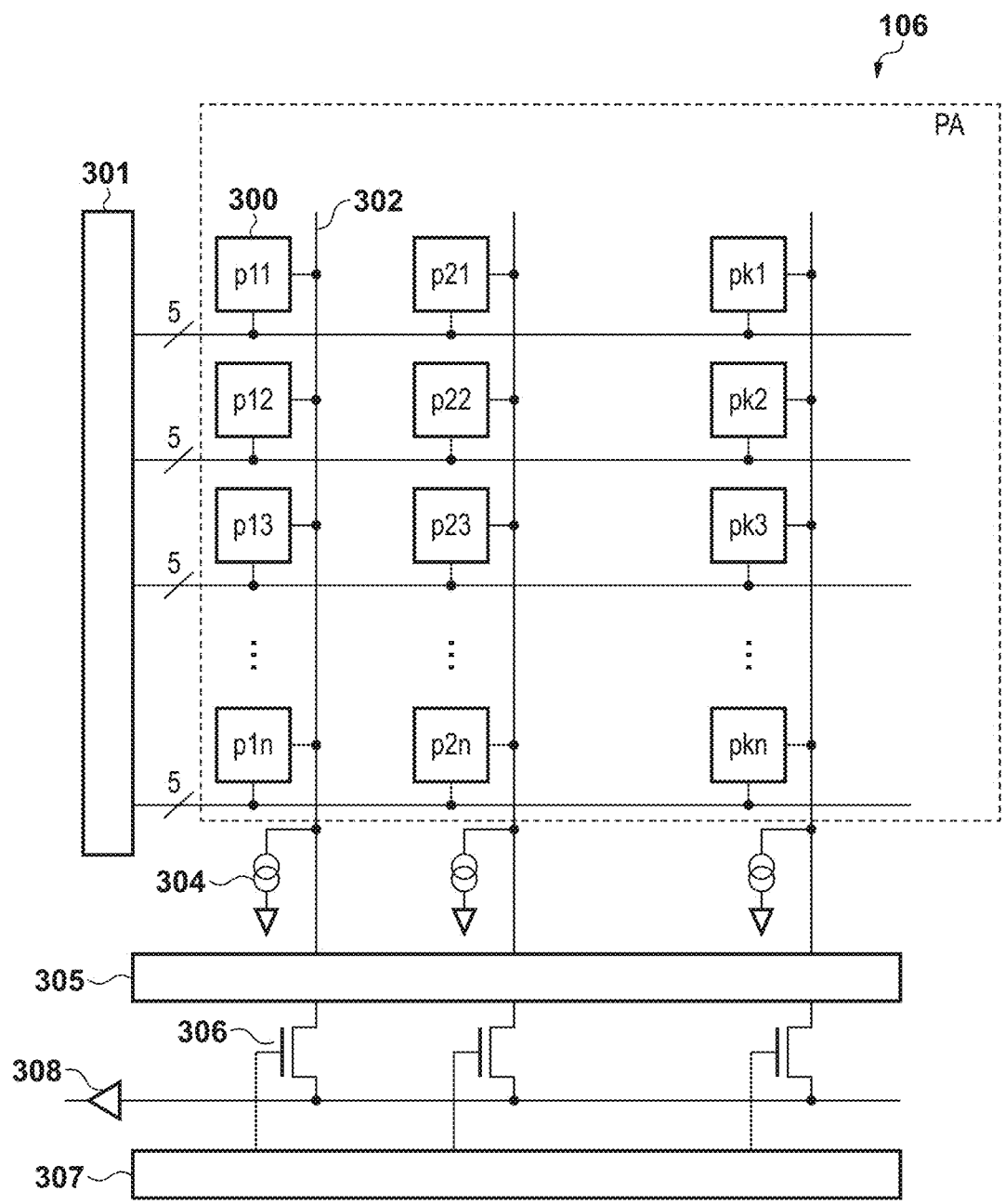
FIG. 3 is a diagram showing the configuration of an image sensor.

FIG. 3 is a diagram showing a schematic configuration of an image sensor 106 that adopts a two-dimensional scanning method in the present embodiment. In FIG. 3, the image sensor 106 has a pixel region PA. In the pixel region PA, unit pixels 300 are arranged two-dimensionally (in a matrix) such as p11 to pkn.

Figure 4:
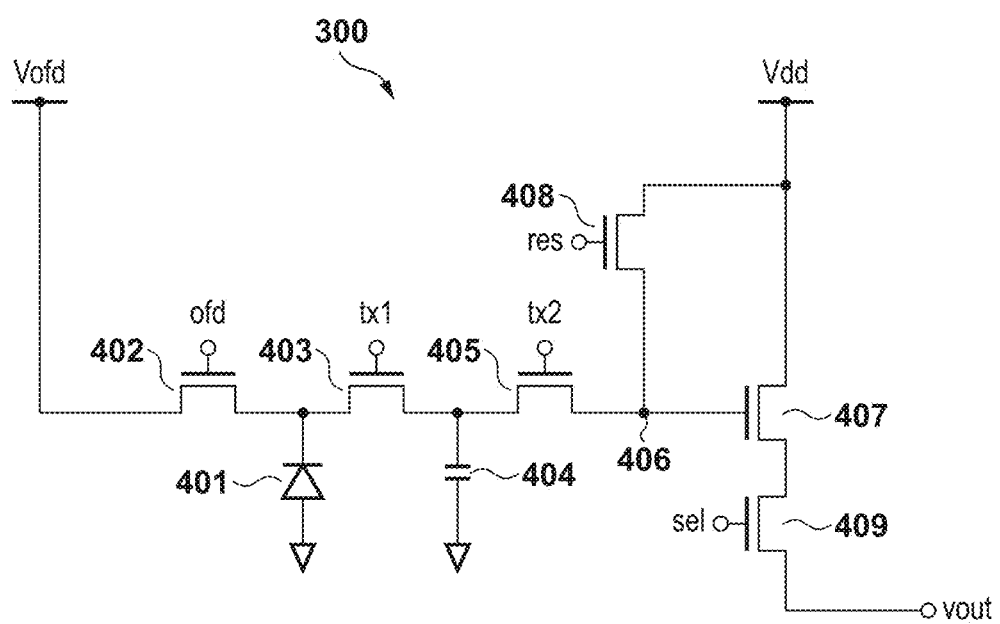
FIG. 4 is a circuit configuration diagram of a unit pixel of the image sensor.

Here, the circuit configuration of a unit pixel 300 (one pixel) will be described, with reference to FIG. 4. FIG. 4 is a circuit configuration diagram of a unit pixel 300. A photodiode (hereinafter, PD) 401 included in each pixel performs photoelectric conversion of a light signal (optical image) incident thereon, and accumulates electric charge that depends on the amount of light exposure. A transfer gate 403 transfers the electric charge that is accumulated in each of the PDs 401 to a memory unit (hereinafter, MEM unit) 404, as a result of a signal tx1 being set to High level. The MEM unit 404 is used for temporarily storing the electric charge accumulated by the PD 401. A transfer gate 405 transfers the electric charge accumulated in each MEM unit 404 to a floating diffusion unit (hereinafter, FD unit) 406, as a result of a signal tx2 being set to High level. The FD unit 406 is connected to the gate of a floating diffusion amplifier (hereinafter, FD amplifier) 407, and converts the electric charge amount transmitted from the PD 401 into a voltage amount.

A reset switch 408 is a switch for resetting the FD unit 406, and resets the FD unit 406, as a result of a signal res being set to High level. Also, electric charge in the PD 401 is reset, as a result of a signal ofd being set to High level and a transfer gate 402 being opened. A pixel selection switch 409 outputs a pixel signal converted into a voltage by the FD amplifier 407 to an output vout of the unit pixel 300 (pixel), as a result of a signal sel being set to High level.

Returning to FIG. 3, a vertical scanning circuit 301 supplies drive signals such as signals tx1, ofd, res, tx2 and sel for controlling transistors (switches) of each of the aforementioned pixels (unit pixels 300) to the unit pixels 300. These drive signals are common to every row of the pixel region PA, and the signals of the nth scanning line (hereinafter, nth line) selected by the vertical scanning circuit 301 are respectively given as φTX1 n, φOFD n, φRES n, φTX2 n and φSEL n. The output rout of each pixel is connected to a column common readout circuit 305 via a vertical output line 302 for every column. The vertical output line 302 is provided for every column, and the outputs rout of the unit pixels 300 for one column are connected thereto. A current source 304 is connected to the vertical output line 302, and a source follower circuit is constituted by the current sources 304 and the FD amplifiers 407 of the unit pixels 300 connected to the vertical output line 302.

The output of the column common readout circuit 305 is connected to a horizontal transfer switch 306. The horizontal transfer switch 306 is a switch for selecting pixel data (pixel signals) read out by the column common readout circuit 305, and is driven by a horizontal scanning circuit 307. The selected pixel data is amplified with an output amplifier 308 and output from the image sensor 106 by the horizontal scanning circuit 307.

Next, operations from the start of electric charge accumulation to read out of image signals in the image sensor 106 employing the drive method of the present embodiment will be described using FIGS. 5A and 5B.

With the drive method of the present embodiment, signal readout is performed by combining lines 5001 in which electric charge accumulated with a global shutter system is read out on a row-by-row basis and lines 5000 in which electric charge accumulated with a slit rolling shutter system is read out on a row-by-row basis.

In the drive method of the present embodiment, electric charge accumulated with the global shutter system is read from an n+1th line to a 2n−1th line and from a 2n+1th line to a 3n−1th line. First, a pulse φRES and a pulse φTX2 are applied to all of the lines between times t501 and t502, and the transfer switches 405 and the reset switches 408 are turned on. Unnecessary electric charge that has accumulated in the MEM units 404 and the FD units 406 of all of the lines is thereby removed and a reset operation is performed. Also, at the same timing, pulses φOFD n+1 to φOFD 2n−1 and pulses φOFD 2n+1 to φOFD 3n−1 are applied, and the transfer gates 402 are turned on. Unnecessary electric charge that has accumulated in the PDs 401 of the n+1th line to 2n−1th line and the 2n+1th line to 3n−1th line is thereby removed and a reset operation is performed.

Subsequently, application of the pulses φRES and φTX2 is canceled at time t502, and the transfer switch 405 and the reset switch 408 turn off. Also, at the same timing, application of the pulses φOFD n+1 to φOFD 2n−1 and the pulses φOFD 2n+1 to φOFD 3n−1 is canceled. The transfer gates 402 thereby turn off, and the accumulation operation of electric charge in the PDs 401 of the n+1th line to 2n−1th line and the 2n+1th line to 3n−1th line is started.

Pulses φTX1 n+1 to φTX1 2n−1 and pulses φTX1 2n+1 to φTX1 3n−1 are applied between times t503 and t504, the transfer switches 403 turns on, and a MEM transfer operation for transferring electric charge accumulated in the PDs 401 to the MEM units 404 is performed.

Next, in the nth line, electric charge is accumulated with the slit rolling shutter system and accumulated electric charge is read out. A pulse φOFD n is applied between times t504 and t505, and the transfer gates 402 are turned on. Unnecessary electric charge that has accumulated in the PDs 401 of the nth line is thereby removed and a reset operation is performed. Subsequently, application of the pulse φOFD n is canceled at time t505, the transfer gates 402 turn off, and the accumulation operation of electric charge in the PDs 401 of the nth line is started. Subsequently, pulses φTX1 n and φTX2 n are applied between times t506 and 1507, the transfer switches 403 and the transfer switches 405 turn on, and an FD transfer operation for transferring electric charge accumulated in the PDs 401 to the FD units 406 is performed. Following the end of the FD transfer operation of the nth line, a pulse φSEL n is applied between times t507 and t508 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the nth line is thus completed.

Next, a pulse ϕTX2 n+1 is applied between times t508 and t509, the transfer switches 405 turn on, and the FD transfer operation for transferring electric charge accumulated in the MEM units 404 to the FD units 406 is performed. Following the end of the FD transfer operation of the n+1th line, a pulse ϕSEL n+1 is applied between times t509 and t510 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the n+1th line is thus completed.

Next, a pulse ϕTX2 n+2 is applied between times t510 and t511, the transfer switches 405 turn on, and the FD transfer operation for transferring electric charge accumulated in the MEM units 404 to the FD units 406 is performed. Following the end of the FD transfer operation of the n+2th line, a pulse ϕSEL n+2 is applied between times t511 and t512 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the n+2th line is thus completed.

FD transfer and readout of pixel signals from the n+3th line to 2n−2th line are executed between times t512 and t513, with this being a repetition of the same operations as above, and thus illustration thereof is omitted in FIGS. 5A and 5B.

Next, a pulse ϕTX2 2n−1 is applied between times t513 and t514, the transfer switches 405 turn on, and the FD transfer operation for transferring electric charge accumulated in the MEM units 404 to the FD units 406 is performed. Following the end of the FD transfer operation of the 2n−1th line, a pulse ϕSEL 2n−1 is applied between times t514 and t515 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in 2n−1th line is thus completed.

Next, a pulse ϕTX2 2n+1 is applied between times t515 and t516, the transfer switches 405 turn on, and the FD transfer operation for transferring electric charge accumulated in the MEM units 404 to the FD units 406 is performed. Following the end of the FD transfer operation of the 2n+1 th line, a pulse ϕSEL 2n+1 is applied between times t516 and t517 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the 2n+1th line is thus completed.

Next, a pulse ϕTX2 2n+2 is applied between times t517 and 1518, the transfer switches 405 turn on, and the FD transfer operation for transferring electric charge accumulated in the MEM units 404 to the FD units 406 is performed. Following the end of the FD transfer operation of the 2n+2th line, a pulse ϕSEL 2n+2 is applied between times t518 and t519 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the 2n+2th line is thus completed.

FD transfer and readout of pixel signals from the 2n+3th line to the 3n−2th line are performed between times t519 and 1520, with this being a repetition of the same operations as above, and thus illustration thereof is omitted in FIGS. 5A and 5B.

Next, a pulse ϕTX2 3n−1 is applied between times t520 and t521, the transfer switches 405 turn on, and the FD transfer operation for transferring electric charge accumulated in the MEM units 404 to the FD units 406 is performed. Following the end of the FD transfer operation of the 3n−1th line, a pulse ϕSEL 3n−1 is applied between times t521 and t522 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the 3n−1th line is thus completed.

Next, in the 2nth line, electric charge is accumulated with the slit rolling shutter system and accumulated electric charge is read out. A pulse ϕOFD 2n is applied between times t523 and t524 and the transfer gate 402 turns on. Unnecessary electric charge that has accumulated in the PDs 401 of the 2nth line is thereby removed and a reset operation is performed. Subsequently, application of the pulse ϕOFD 2n is canceled at time t524, the transfer gates 402 turn off, and the accumulation operation of electric charge in the PDs 401 of the 2nth line is started. Subsequently, pulses ϕTX1 2n and ϕTX2 2n are applied between times t525 and t526, the transfer switch 403 and the transfer switch 405 turn on, and the FD transfer operation for transferring electric charge accumulated in the PDs 401 to the FD units 406 is performed. Following the end of the FD transfer operation of the 2nth line, a pulse ϕSEL 2n is applied between times t526 and t527 and the selection switches 409 turn on. The electric charge held in the FD units 406 is thereby converted into voltages, the voltages are output to the readout circuit as pixel signals, and the pixel signals are sequentially output by the horizontal scanning circuit 307. Readout of the pixel signals from the pixels in the 2nth line is thus completed.

In this way, in the present embodiment, the pixel signals are read out by combining lines in which electric charge accumulated with the global shutter system is read out and lines in which electric charge accumulated with the slit rolling shutter system is read out.

FIG. 6 is a diagram showing a sequence in the present embodiment at the accumulation timing and readout timing of the sensor.

As shown in FIGS. 5A and 5B, in the present embodiment, lines 5001 in which electric charge is accumulated with the global shutter system and lines 5000 in which electric charge is accumulated with the slit rolling system are combined. Also, the lines of these two systems cannot be read out at the same time, since a common readout circuit is used, as shown in FIGS. 3 and 4. Thus, the lines of the above two systems are read out exclusively (so as to not overlap temporally) with regard to time.

In the lines 5001 in which electric charge is accumulated with the global shutter system, an image A accumulated in an accumulation period set to a time that is sufficiently longer than the cycle of the change in light intensity of flicker is acquired. This image A is then used as an image for live view (LV) display. The image A is read out within one vertical synchronous period (hereinafter, 1 VD) in sync with a vertical synchronization signal (hereinafter, VD signal) that is output in sync with the frame rate of LV display.

Also, in the lines 5000 in which electric charge is accumulated with the slit rolling system, an image B accumulated in an accumulation period set to a time that is shorter than the cycle of the change in light intensity of flicker is acquired. This image B is not used as an image for LV display. The image B is read out over a longer time than the flicker cycle time (over a plurality of frames) in sync with the cycle time of flicker. This computation (discussed in detail later) shown in FIGS. 8 and 9 is performed on the basis of the image A and the image B, and flicker is detected.

Figure 7:
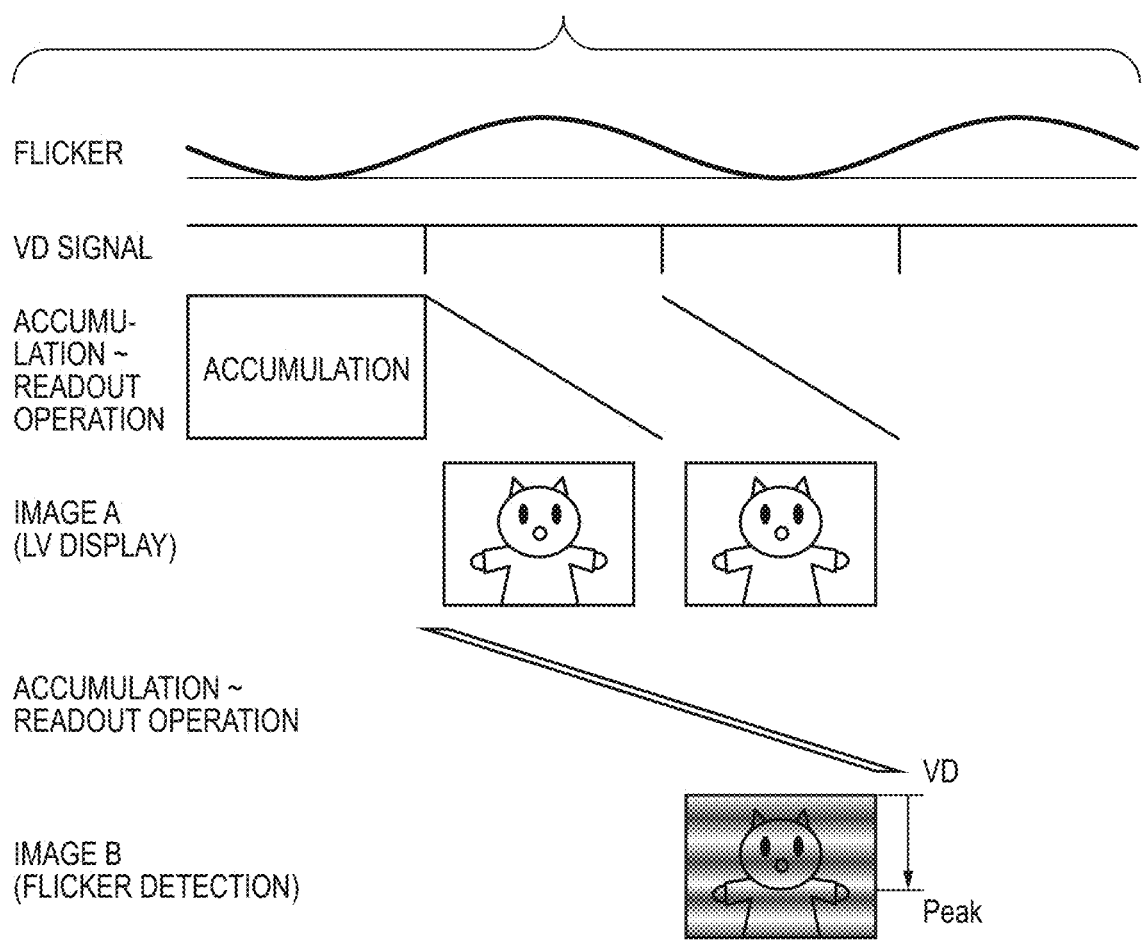
FIG. 7 is a diagram showing the change in the light amount of flicker and captured images.

FIG. 7 shows the images A and B captured with the sequence of FIG. 6. The image A is exposed (accumulated) for a time that is sufficiently longer than the cycle of flicker, thus obtaining an image in which exposure unevenness caused by flicker is reduced. Also, the image A is read out within one VD, in sync with the VD signal that is output in sync with the frame rate of LV display. In the present embodiment, this image is acquired and displayed as a normal LV image.

The image B is accumulated for a shorter time than the cycle of flicker, thus obtaining an image in which exposure unevenness caused by flicker occurs. Also, the image B is read out over time longer than flicker cycle time in sync with the cycle time of flicker. Also, accumulation of electric charge employing the slit rolling system is performed over a longer period than the cycle of flicker, thus obtaining accumulated images at the timing at which the change in the light amount of flicker are local maxima and local minima. These images are not LV displayed.

Figure 8:
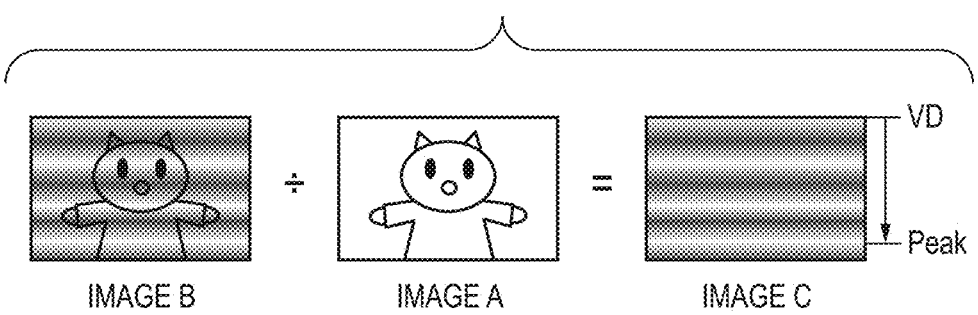
FIG. 8 is a diagram showing a computation for extracting a stripe component caused by flicker.
Figure 9:
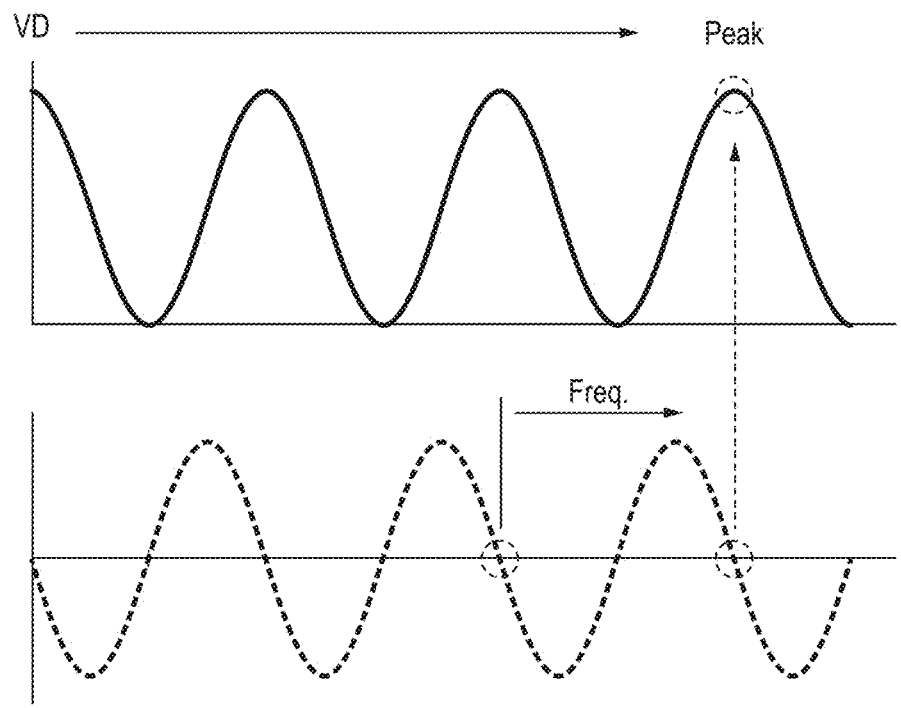
FIG. 9 is a diagram showing the cycle of flicker and the change in light amount.

FIG. 8 is a diagram showing computational processing on the images acquired in FIG. 7. The image B in FIG. 7 is an image captured such that exposure unevenness caused by flicker occurs, and the image A in FIG. 7 is an image captured such that exposure unevenness is reduced. These two images are divided to obtain an image C. Dividing the image B in which exposure unevenness caused by flicker occurs by the image A in which exposure unevenness caused by flicker is reduced enables an image C consisting of only the exposure unevenness component caused by flicker to be extracted.

An image in which exposure unevenness caused by flicker occurs such as the image B is, however, captured with a short exposure time, in order to increase the likelihood of exposure unevenness caused by flicker occurring. On the other hand, an image in which exposure unevenness caused by flicker is reduced such as the image A is captured with an exposure time that is an integer multiple of the flicker cycle or longer so that exposure unevenness caused by flicker does not appear. Thus, the difference in the exposure amounts appears when the two images are directly divided. In view of this, it is necessary to match the signal levels by adopting measures such as adjusting gain at the time of image acquisition or apply gain to the acquired images. Also, in the case where the position of the object moves between the image A and the image B or the orientation of the camera changes, it is necessary to perform division after dividing screens of the images, calculating the degree of coincidence of the images and aligning the images.

Thus, the timing at which the light amount of flicker from VD peaks is found on the basis of the image C consisting of only the exposure unevenness component caused by flicker obtained in this manner. The flicker cycle is also derived on the basis of this image.

FIG. 9 is a diagram showing the change in light amount (solid line) indicated by the image C in FIG. 8 and the contiguity difference (dashed line) of the data of this change in light amount, and is a diagram showing how to detect the peak of the light amount of flicker in the image C of FIG. 8. Here, the position at which the value of the dashed line is "0" indicates a local maximum or a local minimum of the change in light amount. In particular, a "0" value when the dashed line changes from positive to negative will be a local maximum. If the line of the screen to which the peak of this light amount of flicker belongs is known, the time from VD to the peak can be derived on the basis of the cycle of a horizontal synchronization signal (hereinafter, HD). Also, it becomes possible to derive the cycle of flicker by deriving the time from "0" to "0" of the dashed line. The cycle of flicker detected by the above technique is used in order to capture a still image at the peak timing of flicker, and the like.

As described above, according to the present embodiment, it becomes possible to detect flicker while maintaining the frame rate of LV display, by reading out the image A and the image B at the same time with one image sensor.

Second Embodiment

In the first embodiment, the global shutter system was adopted as the electric charge accumulation method of lines for obtaining the image A. In the present embodiment, the slit rolling shutter system is adopted as the electric charge accumulation method of lines for obtaining the image A.

Figure 10:
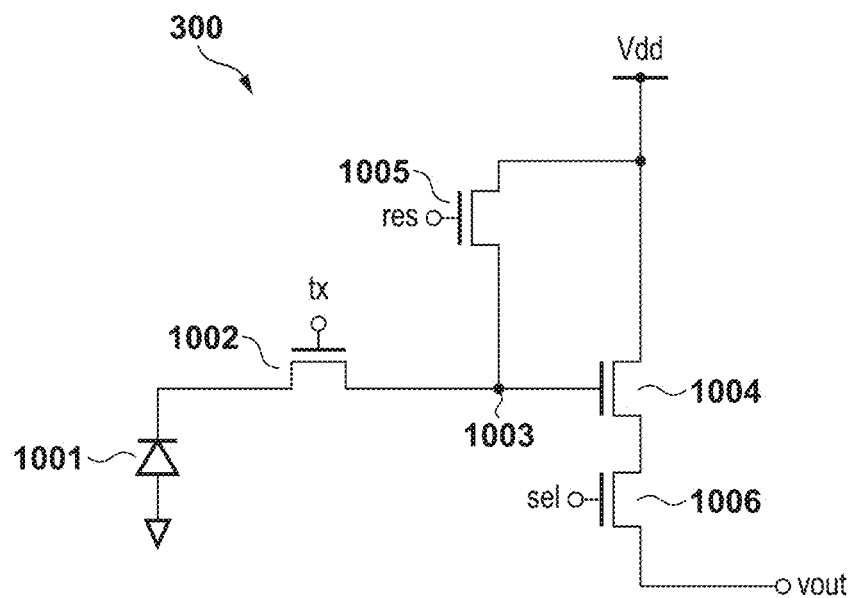
FIG. 10 is a circuit configuration diagram of a unit pixel of an image sensor in a second embodiment.

FIG. 10 is a diagram showing a circuit configuration of a unit pixel 300 of the image sensor in the present embodiment. A PD 1001 photoelectrically converts an incident light signal (optical image), and accumulates electric charge that depends on the amount of light exposure. A transfer gate 1002 transfers electric charge that has accumulated in each PD 1001 to an FD unit 1003, as a result of a signal tx being set to High level. The FD unit 1003 is connected to a gate of an FD amplifier 1004, and the amount of electric charge transferred from the PD 1001 by the FD amplifier 1004 is converted into a voltage. A reset switch 1005 is a switch for resetting the FD unit 1003, and resets the FD unit 1003, as a result of a signal res being set to High level. Also, in the PD 1001, the electric charge is reset, as a result of the signal tx and the signal res being set to High level and the transfer gate 1002 and the reset switch 1005 being opened. A pixel selection switch 1006 outputs the pixel signal converted into a voltage by the FD amplifier 1003 to an output vout of the unit pixel 300, as a result of a signal sel being set to High level.

Figure 11A:
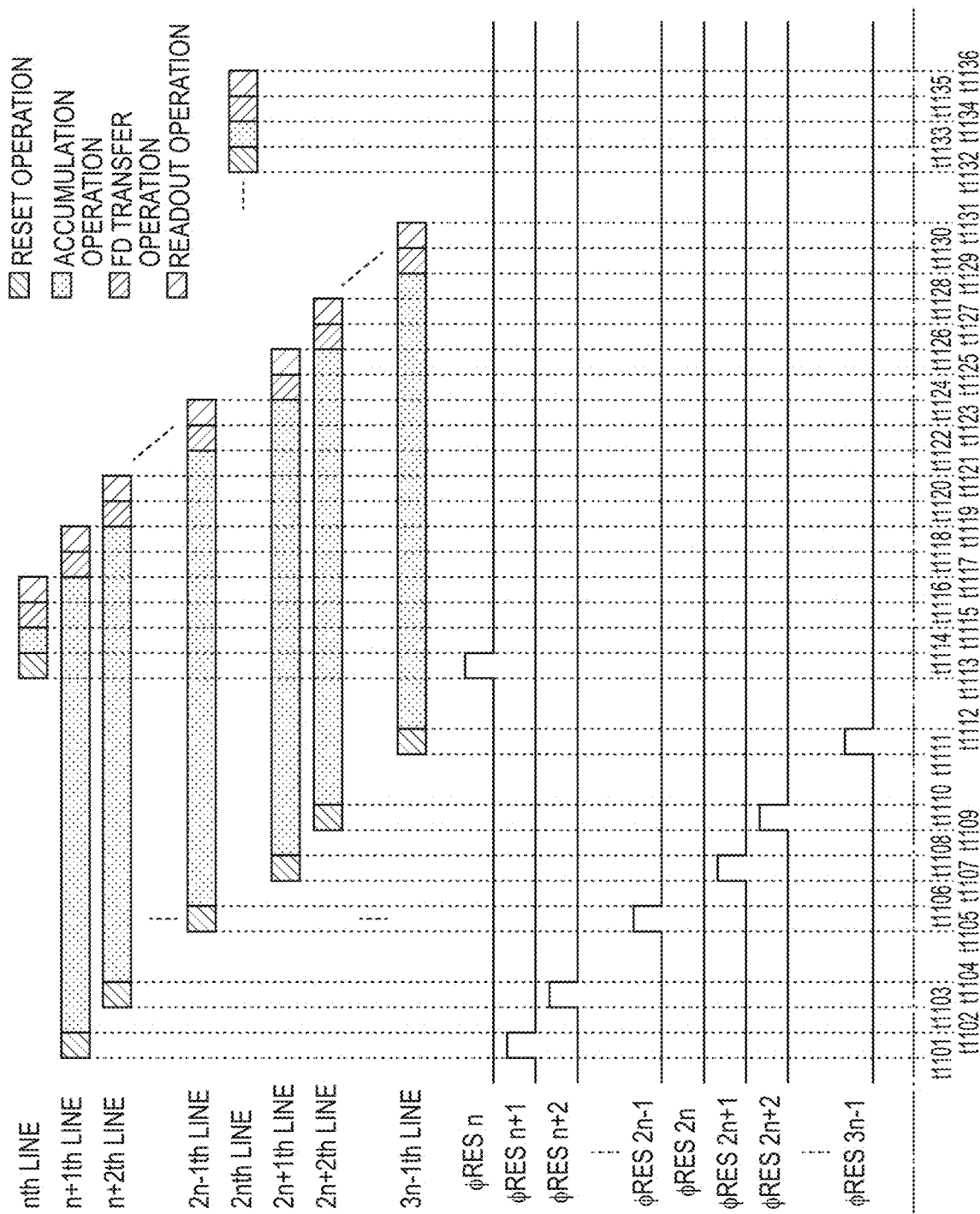

Next, operations from the start of electric charge accumulation to readout of image signals in an image sensor 106 employing the drive method of the present embodiment will be described using FIGS. 11A and 11B. In the drive method of the present embodiment, the lines for obtaining the image A and the lines for obtaining the image B are both driven with the slit rolling shutter system.

First, pulses φRES n+1 and φTX n+1 are applied between times t11101 and t1102, and the transfer gates 1002 and reset switches 1005 of the n+1 th line turn on. Unnecessary electric charge that has accumulated in the PDs 1001 and the FD units 1003 of the n+1th line is thereby removed and a reset operation is performed.

Subsequently, application of the pulses φRES n+1 and φTX n+1 is canceled at time t1102, the transfer gates 1002 and the reset switches 1005 of the n+1 th line turn off, and the accumulation operation of electric charge in the PDs 1001 of the n+1th line is started.

Next, pulses φRES n+2 and φTX n+2 are applied between times t1103 and t1104, and the transfer gates 1002 and the reset switches 1005 of the n+2th line turn on. Unnecessary electric charge that has accumulated in the PDs 1001 and the FD units 1003 of the n+2th line is thereby removed and a reset operation is performed.

Subsequently, application of the pulses φRES n+2 and φTX n+2 is canceled at time t1104, the transfer gates 1002 and the reset switches 1005 of the n+2th line turn off, and the accumulation operation of electric charge that is produced in the PDs 1001 of the n+2th line is started.

Next, pulses φRES 2n−1 and φTX 2n−1 are applied between times t1105 and t1106, and the transfer gates 1002 and the reset switches 1005 of the 2n−1th line turn on. Unnecessary electric charge that has accumulated in the PDs 1001 and the FD units 1003 of the 2n−1th line is thereby removed and a reset operation is performed.

Subsequently, application of the pulses φRES 2n−1 and φTX 2n−1 is canceled at time t1106, the transfer gates 1002 and the reset switches 1005 of the 2n−1th line turn off, and the accumulation operation of electric charge that is produced in the PDs 1001 of the 2n−1 th line is started.

Next, pulses φRES 2n+1 and φTX 2n+1 are applied between times t1107 and t1108, and the transfer gates 1002 and reset switches 1005 of the 2n+1th line turn on. Unnecessary electric charge that has accumulated in the PDs 1001 and the FD units 1003 of the 2n+1th line is thereby removed and a reset operation is performed.

Subsequently, application of pulses φRES 2n+1 and φTX 2n+1 is canceled at time t1108, the transfer gates 1002 and reset switches 1005 of the 2n+1th line turn off, and the accumulation operation of electric charge that is produced in the PDs 1001 of the 2n+1th line is started.

Next, pulses φRES 2n+2 and φTX 2n+2 are applied between times t1109 and t1110, and the transfer gates 1002 and reset switches 1005 of the 2n+2th line turn on. Unnecessary electric charge that has accumulated in the PDs 1001 and the FD units 1003 of the 2n+2th line is thereby removed and a reset operation is performed.

Subsequently, application of the pulses φRES 2n+2 and φTX 2n+2 is canceled at time t1110, the transfer gates 1002 and reset switches 1005 of the 2n+2th line turn off, and the accumulation operation of electric charge that is produced in the PDs 1001 of the 2n+2th line is started.

Next, pulses φRES 3n−1 and φTX 3n−1 are applied between times t1111 and t1112, and the transfer gates 1002 and the reset switches 1005 of the 3n−1th line turn on. Unnecessary electric charge that has accumulated in the PDs 1001 and the FD units 1003 of the 3n−1th line is thereby removed and a reset operation is performed.

Subsequently, application of the pulses φRES 3n−1 and φTX 3n−1 is canceled at time t1112, the transfer gates 1002 and the reset switches 1005 of the 3n−1th line turn off, and the accumulation operation of electric charge that is produced in the PDs 1001 of the 3n−1 th line is started.

Next, pulses φRES n and φTX n are applied between times t1113 and t1114, and the transfer gates 1002 and the reset switches 1005 of the nth line turn on. Unnecessary electric charge that has accumulated in the PDs 1001 and the FD units 1003 of the nth line is thereby removed and a reset operation is performed.

Subsequently, application of the pulses φRES n and φTX n is canceled at time t1114, the transfer gates 1002 and the reset switches 1005 of the nth line turn off, and the accumulation operation of electric charge that is produced in the PDs 1001 of the nth line is started.

Next, the pulse φTX n is applied between times t1115 and t1116, and the transfer gates 1002 of the nth line turn on. The FD transfer operation for transferring the electric charge accumulated in the PDs 1001 of the nth line to the FD units 1003 is thereby performed.

Next, the electric charge held in the FD units 1003 is converted into voltages, as a result of a pulse φSEL n being applied between times t1116 and t1117 and the selection switches 1006 turning on. The voltages are then output to the readout circuit as pixel signals, and the pixel signals are sequentially output by the horizontal scanning circuit 307. Readout of the pixel signals from the pixels in the nth line is thereby completed.

Next, a pulse φTX n+1 is applied between times t1117 and t1118, and the transfer gates 1002 of the n+1th line turn on. The FD transfer operation for transferring the electric charge accumulated in the PDs 1001 of the n+1th line to the FD units 1003 is thereby performed.

Next, the electric charge held in the FD units 1003 is converted into voltages, as a result of a pulse φSEL n+1 being applied between times t1118 and t1119 and the selection switches 1006 turning on. The voltages are then output to the readout circuit as pixel signals, and the pixel signals are sequentially output by the horizontal scanning circuit 307. Readout of the pixel signals from the pixels in the n+1th line is thereby completed.

Next, a pulse φTX n+2 is applied between times t1119 and t1120, and the transfer gates 1002 of the n+2th line turn on. The FD transfer operation for transferring the electric charge accumulated in the PDs 1001 of the n+2th line to the FD units 1003 is thereby performed.

Subsequently, the electric charge held in the FD units 1003 is converted into voltages, as a result of a pulse φSEL n+2 being applied between times t1120 and t1121 and the selection switches 1006 turning on. The voltages are then output to the readout circuit as pixel signals, and the pixel signals are sequentially output by the horizontal scanning circuit 307. Readout of the pixel signals from the pixels in the n+2th line is thereby completed.

Next, a pulse φTX 2n−1 is applied between times t1122 and t1123, and the transfer gates 1002 of the 2n−1th line turn on. The FD transfer operation for transferring the electric charge accumulated in the PDs 1001 of the 2n−1th line to the FD units 1003 is thereby performed.

Subsequently, the electric charge held in the FD units 1003 is converted into voltages, as a result of a pulse φSEL 2n−1 being applied between times t1123 and t1124 and the selection switches 1006 turning on. The voltages are then output to the readout circuit as pixel signals, and the pixel signals are sequentially output by the horizontal scanning circuit 307. Readout of the pixel signals from the pixels in 2n−1th line is thereby completed.

Next, a pulse φTX 2n+1 is applied between times t1124 and t1125, and the transfer gates 1002 of the 2n+1th line turn on. The FD transfer operation for transferring electric charge accumulated in the PDs 1001 of the 2n+1th line to the FD units 1003 is thereby performed.

Subsequently, the electric charge held in the FD units 1003 is converted into voltages, as a result of a pulse φSEL 2n+1 being applied between times t1125 and t1126 and the selection switches 1006 turning on. The voltages are then output to the readout circuit as pixel signals, and the pixel signals are sequentially output by the horizontal scanning circuit 307. Readout of the pixel signals from the pixels in the 2n+1th line is thereby completed.

Next, a pulse φTX 2n+2 is applied between times t1126 and t1127, and the transfer gates 1002 of the 2n+2th line turn on. The FD transfer operation for transferring electric charge accumulated in the PDs 1001 of the 2n+2th line to the FD units 1003 is thereby performed.

Subsequently, the electric charge held in the FD units 1003 is converted into voltages, as a result of a pulse φSEL 2n+2 being applied between times t1127 and t1128 and the selection switches 1006 turning on. The voltages are then output to the readout circuit as pixel signals, and the pixel signals are sequentially output by the horizontal scanning circuit 307. Readout of the pixel signals from the pixels in the 2n+2th line is thereby completed.

Next, a pulse φTX 3n−1 is applied between times t1129 and t1130, and the transfer gates 1002 of the 3n−1th line turn on. The FD transfer operation for transferring the electric charge accumulated in the PDs 1001 of the 3n−1th line to the FD units 1003 is thereby performed.

Subsequently, the electric charge held in the FD units 1003 is converted into voltages, as a result of a pulse φSEL 3n−1 being applied between times t1130 and t1131 and the selection switches 1006 turning on. The voltages are then output to the readout circuit as pixel signals, and the pixel signals are sequentially output by the horizontal scanning circuit 307. Readout of the pixel signals from the pixels in the 3n−1th line is thereby completed.

Next, pulses φRES 2n and φTX 2n are applied between times t1132 and t1133, and the transfer gates 1002 and the reset switches 1005 of the 2nth line turn on. Unnecessary electric charge that has accumulated in the PDs 1001 and the FD units 1003 of the 2nth line is thereby removed and a reset operation is performed.

Subsequently, application of the pulses φ2n and φTX 2n is canceled at time t1133, the transfer gates 1002 and the reset switches 1005 of the 2nth line turn off, and the accumulation operation of electric charge in the PDs 1001 of the 2nth line is started.

Next, a pulse φTX 2n is applied between times t1134 and t1135, and the transfer gates 1002 of the 2nth line turn on. The FD transfer operation for transferring the electric charge accumulated in the PDs 1001 of the 2nth line to the FD units 1003 is thereby performed.

Next, the electric charge held in the FD units 1003 is converted into voltages, as a result of a pulse φSEL 2n being applied between times t1135 and t1136 and the selection switches 1006 turning on. The voltages are then output to the readout circuit as pixel signals, and the pixel signals are sequentially output by the horizontal scanning circuit 307. Readout of the pixel signals from the pixels in the 2nth line is thereby completed.

As a result of the above operations, an image A and an image B such as shown in FIG. 6 can also be obtained in the present embodiment. The method of deriving the cycle and peak of flicker from the image A and the image B is similar to the first embodiment.

As described above, according to the present embodiment, it becomes possible to implement flicker detection while maintaining the frame rate of LV display, even in an image sensor having a pixel structure without a memory unit.

Third Embodiment

In the first embodiment, restrictions were not placed on which lines in the pixel region PA of the image sensor 106 are used in order to obtain the image B. Also, restrictions were also not placed on the readout timing of the lines for obtaining the image B. In the present embodiment, in order to improve the accuracy of flicker detection, restrictions are placed on the arrangement in the pixel region PA of the lines for obtaining the image B and the readout timing.

Figure 12:
FIG. 12 is a diagram showing a distribution of lines that are used in flicker detection images in a third embodiment.
Figure 13:
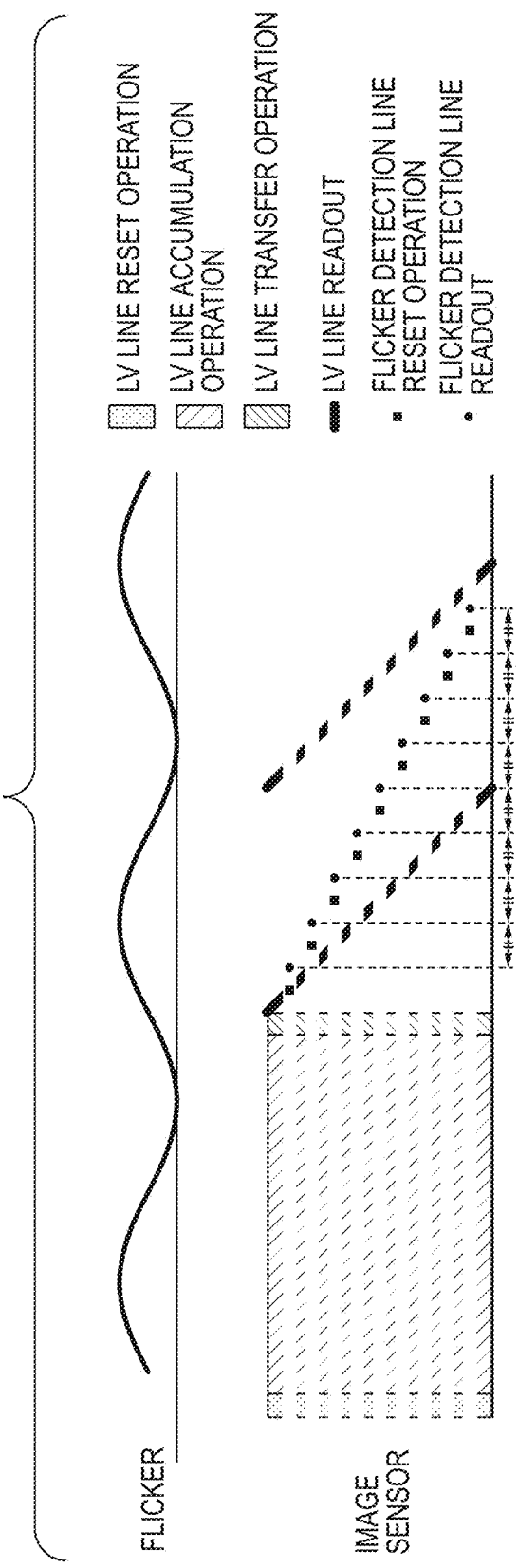
FIG. 13 is a diagram showing the change in the light amount of flicker and the accumulation timing of captured images in the third embodiment.

As shown in FIG. 12, the lines in which electric charge is accumulated with the slit rolling system in order to obtain the image B are selected so as to be at even intervals in the pixel region PA of the image sensor 106. Also, as shown in FIG. 13, readout of the lines for obtaining the image B is performed so as to be at temporally even intervals within the readout time.

According to the present embodiment, pixel signals are sampled at temporally even intervals with respect to changes in the light amount of flicker, thus making it easier to judge the degree of change in the light amount over time, and enabling flicker to be accurately detected as a result.

Fourth Embodiment

The first embodiment described the case where the image A is read out every frame in sync with the frame rate of LV display, and the image B is read out over a longer time than the cycle of flicker in sync with the flicker cycle. The present embodiment describes the image capturing operation in the case where the readout time of one frame of the image B is shorter than the cycle of flicker.

Figure 14:
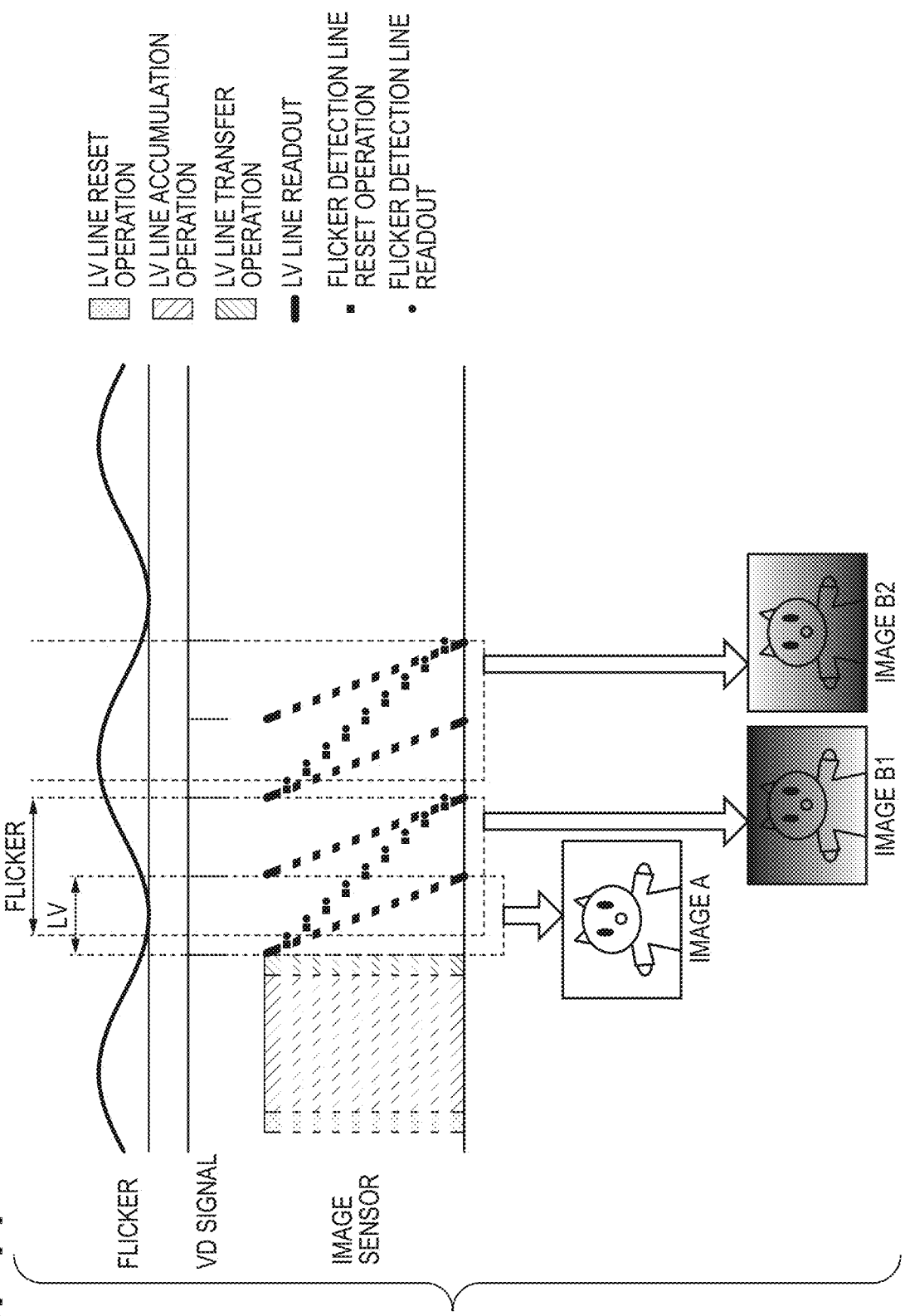
FIG. 14 is a diagram showing the change in the light amount of flicker and the accumulation timing of captured images in a fourth embodiment.

As shown in FIG. 14, in the case where the readout time of one frame of the image B is shorter than flicker cycle, a plurality of frames of images B are acquired, and the images B are read out until the total readout time becomes greater than or equal to one flicker cycle. FIG. 14 shows an example in which the total readout time becomes greater than or equal to one flicker cycle when two frames are read out. The images B read out in the respective frames are given as an image B1 and an image B2.

As shown in FIG. 15, an image C1 and an image C2 are acquired from the image B1 and the image B2 by computational processing with the image A shown in FIG. 8. It becomes possible to derive the cycle of flicker, by connecting the acquired image C1 and image C2 and performing the peak detection shown in FIG. 9.

As described above, according to the present embodiment, it becomes possible to implement flicker detection, even in the case where the image B is read out in a shorter readout time than the flicker cycle.

Although preferred embodiments of the present invention have been described above, the present invention is not limited to these embodiments, and various modifications and changes can be made within the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-144695, filed Jul. 26, 2017, which is hereby incorporated by reference herein in its entirety.

What is claimed is:

1. An image capturing apparatus comprising:
an image sensor having a pixel region in which pixels are two-dimensionally arrayed in a row direction and a column direction; and
at least one processor or circuit configured to perform the operations of the following unit:
a control unit configured to control, on a row-by-row basis, a timing of a start of electric charge accumulation of the pixels and a timing of readout of signals of the pixels,
wherein the control unit, with regard to a first area of the pixel region, causes electric charge accumulation to be performed in a first accumulation period, and causes a first readout of signals of the pixels to be performed in a first readout time, and, with regard to a second area that is different from the first area, causes electric charge accumulation to be performed in a second accumulation period that is shorter than the first accumulation period, and causes a second readout of signals of the pixels to be performed in a second readout time that is longer than the first readout time,
causes the first readout and the second readout to be performed such that a readout time of a unit row which is included in the first area and a readout time of a unit row which is included in the second area do not temporally overlap with each other, wherein each of the readout times of the unit rows in the first and second areas is a readout time period, from start to finish, of the respective unit row, and
wherein the signals of the pixels of the first area are used in live view display, and the signals of the pixels of the second area are used in detection of flicker.

2. The image capturing apparatus according to claim 1, wherein the first area and the second area are separated in units of rows of pixels.

3. The image capturing apparatus according to claim 2, wherein the first area has a plurality of first areas that each have a plurality of rows, and the second area has a plurality of second areas arranged to be separated between the plurality of first areas.

4. The image capturing apparatus according to claim 3, wherein the plurality of first areas each have pixels of equal rows.

5. The image capturing apparatus according to claim 3, wherein the plurality of second areas are arranged in the pixel region at equal intervals in the column direction.

6. The image capturing apparatus according to claim 1, wherein the first accumulation period is set to a longer time than one cycle of change in a light intensity of the flicker.

7. The image capturing apparatus according to claim 1, wherein the second accumulation period is set to a shorter time than one cycle of change in a light intensity of the flicker.

8. The image capturing apparatus according to claim 1, wherein the first readout time is shorter than a frame rate of the live view display.

9. The image capturing apparatus according to claim 1, wherein the second readout time is set to a time that is greater than or equal to one cycle of change in a light intensity of the flicker spanning a plurality of frames of a frame rate of the live view display.

10. The image capturing apparatus according to claim 1, wherein the control unit sets a timing of the second readout such that readout timings of the plurality of second areas will be at even intervals in the second readout time.

11. The image capturing apparatus according to claim 1, wherein the control unit reads out the signals of the pixels of the first area with a global shutter system, and reads out the signals of the pixels of the second area with a slit rolling shutter system.

12. The image capturing apparatus according to claim 1, wherein the control unit reads out the signals of the pixels of the first and second areas with a slit rolling shutter system.

13. A method for controlling an image capturing apparatus that includes an image sensor having a pixel region in which pixels are two-dimensionally arrayed in a row direction and a column direction, the method comprising:
controlling, on a row-by-row basis, a timing of a start of electric charge accumulation of the pixels and a timing of readout of signals of the pixels,
wherein the control includes, with regard to a first area of the pixel region, causing electric charge accumulation to be performed in a first accumulation period, and causing a first readout of signals of the pixels to be performed in a first readout time, and, with regard to a second area that is different from the first area, causing electric charge accumulation to be performed in a second accumulation period that is shorter than the first accumulation period, and causing a second readout of signals of the pixels to be performed in a second readout time that is longer than the first readout time,
causing the first readout and the second readout to be performed such that a readout time of a unit row which is included in the first area and a readout time of a unit row which is included in the second area do not temporally overlap with each other, wherein each of the readout times of the unit rows in the first and second areas is a readout time period, from start to finish, of the respective unit row, and
wherein the signals of the pixels of the first area are used in live view display, and the signals of the pixels of the second area are used in detection of flicker.

14. A computer-readable storage medium storing a program for causing a computer to perform a control method for an image capturing apparatus that includes an image sensor having a pixel region in which pixels are two-dimensionally arrayed in a row direction and a column direction, the method comprising:

controlling, on a row-by-row basis, a timing of a start of electric charge accumulation of the pixels and a timing of readout of signals of the pixels, wherein the control includes, with regard to a first area of the pixel region, causing electric charge accumulation to be performed in a first accumulation period, and causing a first readout of signals of the pixels to be performed in a first readout time, and, with regard to a second area that is different from the first area, causing electric charge accumulation to be performed in a second accumulation period that is shorter than the first accumulation period, and causing a second readout of signals of the pixels to be performed in a second readout time that is longer than the first readout time, causing the first readout and the second readout to be performed such that a readout time of a unit row which is included in the first area and a readout time of a unit row which is included in the second area do not temporally overlap with each other, wherein each of the readout times of the unit rows in the first and second areas is a readout time period, from start to finish, of the respective unit row, and wherein the signals of the pixels of the first area are used in live view display, and the signals of the pixels of the second area are used in detection of flicker.

\* \* \* \* \*